(12) United States Patent
Sun et al.

(10) Patent No.: US 8,900,542 B2
(45) Date of Patent: Dec. 2, 2014

(54) METHOD FOR FORMING GRAPHENE NANORIBBONS

(75) Inventors: Chia-Liang Sun, Taipei (TW); Ching-Tang Chang, New Taipei (TW)

(73) Assignee: Chang Gung University, Tao-Yuan (TW)

( * ) Notice: Subject to any disclaimer, the term of this patent is extended or adjusted under 35 U.S.C. 154(b) by 366 days.

(21) Appl. No.: 13/356,925

(22) Filed: Jan. 24, 2012

(65) Prior Publication Data

US 2012/0195821 A1    Aug. 2, 2012

(30) Foreign Application Priority Data

Feb. 1, 2011    (TW) .............................. 100103921 A

(51) Int. Cl.
*C01B 31/02* (2006.01)
*B82Y 40/00* (2011.01)
(52) U.S. Cl.
CPC ......... *C01B 31/0273* (2013.01); *C01B 2204/06* (2013.01); *Y10S 977/842* (2013.01)
USPC .......................... 423/448; 977/842; 423/447.1

(58) Field of Classification Search
CPC ....................................................... C01B 31/08
USPC ........ 423/447.1–447.3, 445 B; 977/734–741, 977/842–848
See application file for complete search history.

(56) References Cited

U.S. PATENT DOCUMENTS

2004/0222080 A1 * 11/2004 Tour et al. ................ 204/157.15

OTHER PUBLICATIONS

Kosynkin, et al., Longitudinal unzipping of carbon nanotubes to form graphene nanoribbons, Nature 2009; 458: 872-876.*

* cited by examiner

*Primary Examiner* — Daniel C McCracken
(74) *Attorney, Agent, or Firm* — Occhiuti & Rohlicek LLP

(57) ABSTRACT

A method for forming graphene nanoribbons includes: (a) dispersing carbon nanotubes in a solvent to obtain a nanotube-dispersing solution; (b) adding an oxidant into the nanotube-dispersing solution to obtain a reaction solution; and (c) microwave heating the reaction solution and longitudinally unzipping the carbon nanotubes to form graphene nanoribbons.

19 Claims, 5 Drawing Sheets

METHOD FOR FORMING GRAPHENE NANORIBBONS

CROSS-REFERENCE TO RELATED APPLICATION

This application claims priority of Taiwanese application no. 100103921, filed on Feb. 1, 2011.

BACKGROUND OF THE INVENTION

1. Field of the Invention

The present invention relates to a method for forming graphene nanoribbons.

2. Description of the Related Art

As technology progresses, different novel materials and structures, for example, fullerene, carbon nanotube, graphene, and graphene nanoribbon have been developed to meet the requirements of miniaturization of the elements or devices due to their special crystallinity and conductivity.

The graphene nanoribbon is currently the thinnest but hardest nano-material in the world. The graphene nanoribbon is a two-dimensional material that comprises a plurality of sp2-hybridized carbon atoms interconnected to form a one-atom thick sheet having a honeycomb crystal lattice. The graphene nanoribbon is almost completely transparent, and has a thermal conductivity coefficient of 5300 W/m·K that is higher than those of the carbon nanotube and diamond. Further, the graphene nanoribbon has a relatively high electron mobility at room temperature, i.e., about 15000 $cm^2/V \cdot s$, that is higher than those of copper and silver, and has a relatively low resistivity, i.e., about $10^{-6}$ $\Omega \cdot cm$, that is lower than that of copper or silver. Therefore, it is expected that the graphene nanoribbon can be used to develop new electronic components or transistors that are thinner and have high electrical transmission speed, or can be used to manufacture transparent touchscreens, liquid crystal displays, or even solar cells.

Nowadays, graphenenanoribbons have been fabricated by scanning tunneling microscope lithography and chemical vapor deposition. In addition to the above-mentioned methods, carbon nanotubes have been more recently utilized as the starting material to obtain graphene nanoribbons. In the prior literatures, many processes to prepare graphene nanoribbons from carbon nanotubes are disclosed, and include wet chemical methods, physicochemical methods, intercalation-exfoliation, catalytic approaches, electrical methods, sonochemical methods, and electrochemical methods. Kosykin et al (Nature, Vol. 458, p. 872-876, Apr. 16, 2009) disclosed a carbon nanotube-unzipping process that involves treating a carbon nanotube with concentrated sulphuric acid, followed by treating with potassium permanganate as a strong oxidant, and heating at 55-70° C. in a heat convection manner. This process chemically unzips the carbon nanotube to form nanoribbons. However, in this method, the step of heating the carbon nanotube at 55-70° C. has to last for at least two hours in order to achieve a proper condition to unzip the carbon nanotube. Therefore, this method is time-consuming and energy-consuming. In addition, because the heating step lasts for at least two hours, the structure of the carbon nanotube is likely to be destroyed, thereby resulting in low yield and inferior quality of the graphene nanoribbons.

SUMMARY OF THE INVENTION

Therefore, the object of the present invention is to provide a method for forming graphene nanoribbons that can overcome the above drawbacks associated with the prior art.

Accordingly, a method for forming graphene nanoribbons of the present invention comprises: (a) dispersing carbon nanotubes in a solvent to obtain a nanotube-dispersing solution; (b) adding an oxidant into the nanotube-dispersing solution to obtain a reaction solution; and (c) microwave heating the reaction solution and longitudinally unzipping the carbon nanotubes to form graphene nanoribbons.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
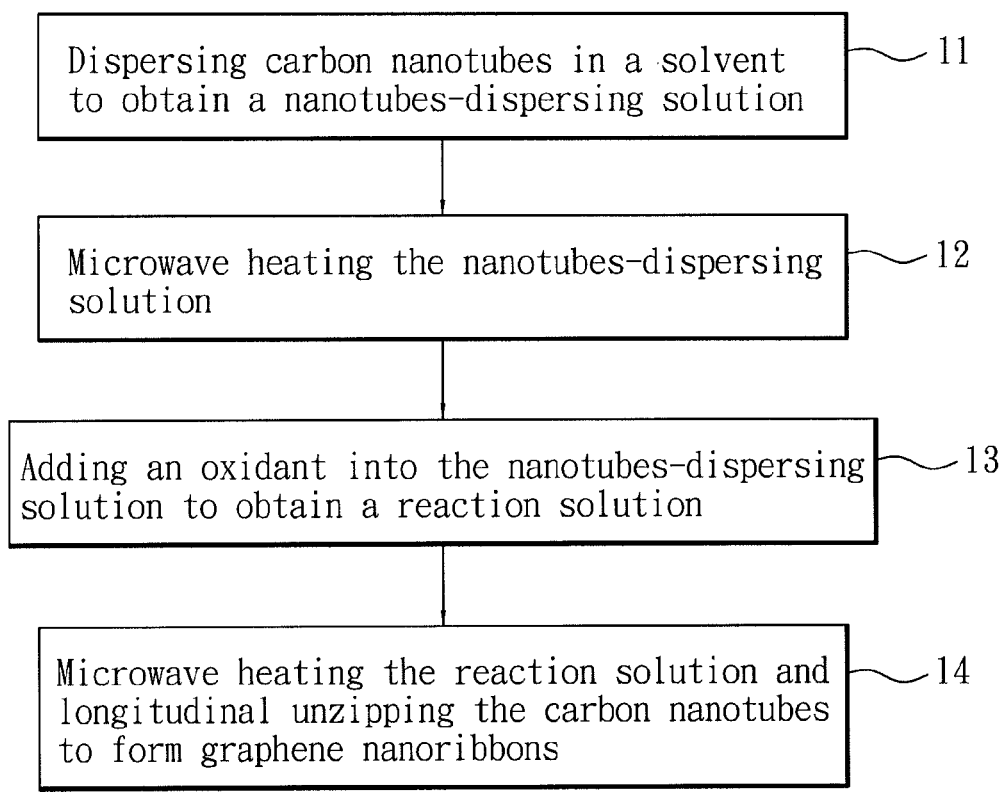
FIG. 1 is a flowchart of the preferred embodiment of a method for forming graphene nanoribbons according to the present invention.

Referring to FIG. 1, the preferred embodiment of a method for forming graphene nanoribbons of the present invention comprises steps 11, 12, 13 and 14.

In step 11, carbon nanotubes are dispersed in a solvent to obtain a nanotube-dispersing solution.

More specifically, in step 11, the multi-layered or single-layered carbon nanotubes are dispersed in an acidic aqueous solution, and stirred for 1 hour at room temperature to obtain the nanotube-dispersing solution.

The acidic aqueous solution is a solution of, e.g., phosphoric acid, sulfuric acid, hydrochloric acid, nitric acid, or combinations thereof, and has a pH value of not greater than 4. It is noted that when the pH value of the acidic aqueous solution is greater than 4, the reactivity of functionalities on the surfaces of the carbon nanotubes will be adversely affected in the subsequent steps. On the other hand, if the pH value of the acidic aqueous solution is too low, the structures of the carbon nanotubes are liable to be damaged, thereby adversely affecting the structure of graphene nanoribbons. Preferably, the acidic aqueous solution has a pH value ranging from 1 to 3. In this embodiment, the acidic aqueous solution is obtained by mixing sulfuric acid and phosphoric acid, and has a pH value ranging from 1 to 3.

In step 12, the nanotube-dispersing solution is subjected to microwave heating so as to surface-modify the carbon nanotubes.

More specifically, in step 12, the surfaces of the carbon nanotubes undergo a functional group grafting reaction to obtain surface-modified carbon nanotubes.

Since the carbon nanotubes with unmodified surfaces will be dramatically aggregated, yield of the graphene nanoribbons may be adversely affected. In other words, the carbon nanotubes must be surface-modified to enhance the dispersibility of the carbon nanotubes in the acidic aqueous solution so as to facilitate the subsequent reactivity, thereby increasing yield of the graphene nanoribbons. In step 12, because the carbon nanotubes are liable to absorb microwave energy, the molecules on the surfaces of the carbon nanotubes are resonated and are rearranged. In this way, the surface modification of the carbon nanotubes can be accomplished. As compared to the conventional surface modification using the heat convection manner, the microwave heating is not only time-saving, but also can eliminate the disadvantage of damage to the structures of the carbon nanotubes due to the long heating time.

It is noted that step 12 is conducted at a microwave power ranging from 50 watts to 2000 watts for not more than 10 minutes. When the microwave power is too high or the time is too long, the structure of the carbon nanotube is liable to be destroyed. When the microwave power is too low, the reaction time is too long, thereby resulting in an insufficient surface modification of the carbon nanotubes and a limited dispersibility of the carbon nanotubes in the acidic aqueous solution. Preferably, step 12 is conducted at a microwave power ranging from 150 watts to 300 watts for not more than 5 minutes.

It is noted that single-layered or multi-layered carbon nanotubes that are preliminarily surface-modified can be used in step 11 to enhance the dispersibility of the carbon nanotubes in the acidic aqueous solution. In such case, step 12 can be omitted.

In step 13, an oxidant is added into the nanotube-dispersing solution to obtain a reaction solution.

More specifically, in step 13, the oxidant is added into the nanotube-dispersing solution followed by stirring for about 30 minutes at room temperature to permit the surfaces of the carbon nanotubes to be in contact with the oxidant so as to obtain the reaction solution. The oxidant is potassium chlorate, sodium chlorate, potassium perchlorate, hydrogen peroxide, potassium permanganate or combinations thereof.

Figure 2:
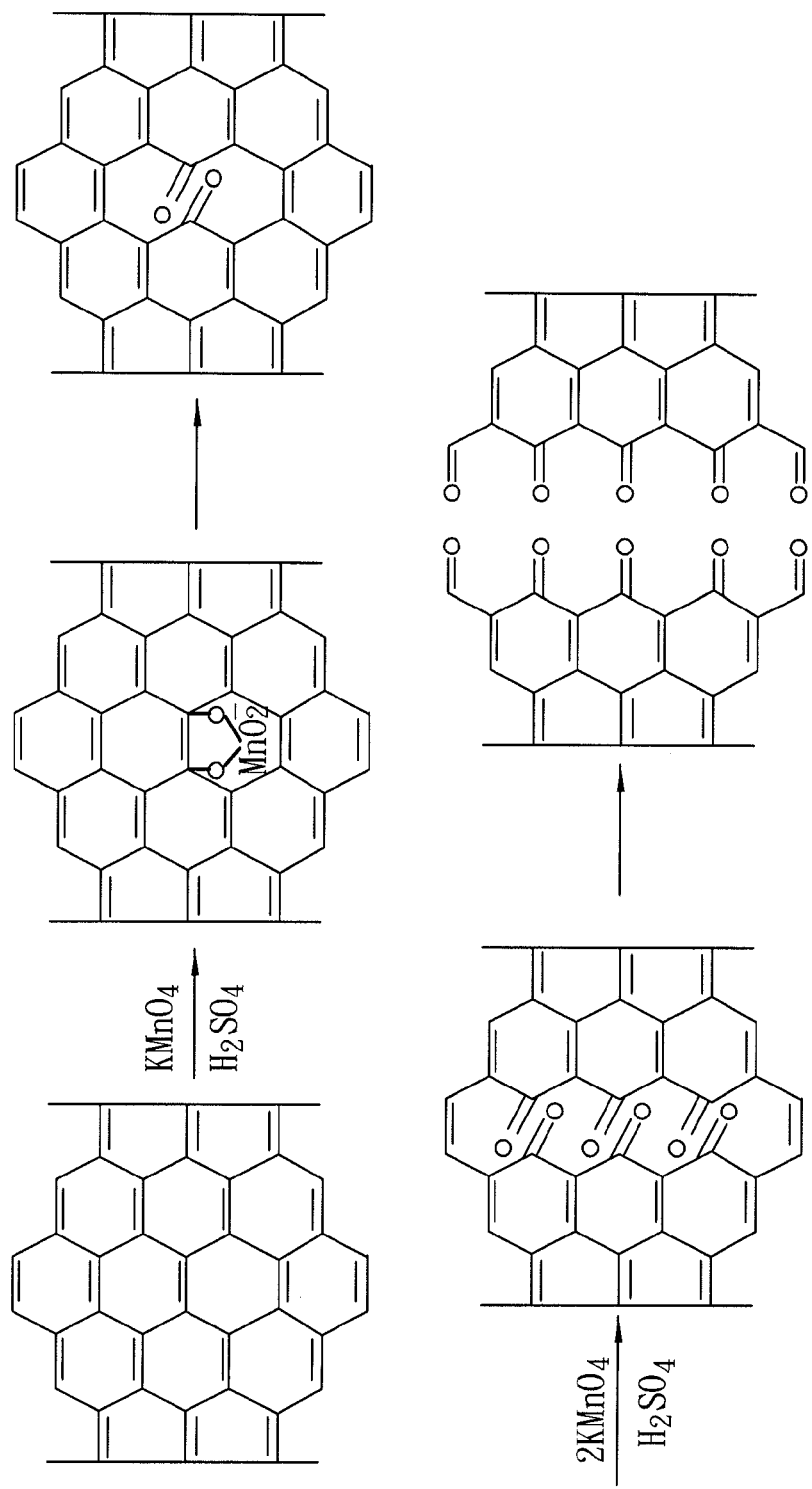
FIG. 2 is a schematic diagram illustrating the reaction of unzipping of the carbon nanotube through an oxidant.

It is noted that the purpose of addition of the oxidant is to oxidize the carbon-carbon double bonds so as to break the ring structures of the carbon nanotubes, thereby longitudinally unzipping the carbon nanotubes to form two-dimensional graphene nanoribbons. The oxidation reaction is shown in FIG. 2. The efficiency of the unzipping of the carbon nanotubes depends on the oxidative ability of the oxidant. Preferably, the oxidant is potassium perchlorate, potassium permanganate or a combination thereof. In addition, it is noted that if the amount of the oxidant is insufficient, the unzipping of the carbon nanotubes will be incomplete, thereby resulting in a low yield and low purity of the graphene nanoribbons. Preferably, the weight ratio of the oxidant to the carbon nanotubes is not less than 2/1. More preferably, the weight ratio of the oxidant to the carbon nanotubes is not less than 5/1. Because the unzipping of the carbon nanotubes will not be adversely affected if the amount of the oxidant is too much, the upper limits of the oxidant is not specified in this specification.

Finally, in step 14, the reaction solution is heated by microwave to form graphene nanoribbons.

More specifically, the reaction solution is heated by microwave to enable the oxidized carbon nanotubes in step 13 to further absorb the microwave energy so as to resonate and break the carbon-carbon double bonds, thereby resulting in a more rapid longitudinal unzipping of the carbon nanotubes.

It is noted that, in step 14, when the microwave power is too low, the reaction will be incomplete because, during a constant period of time, the energy applied to the reaction solution is not high enough to provide a sufficient temperature-rising speed. On the other hand, when the microwave power is too high, a violent temperature variation will occur attributed to a high energy supply within a very short time. Therefore, the operation time is difficult to control, thereby adversely affecting the reaction result or resulting in safety problems. Preferably, step 14 is conducted at a temperature ranging from 50° C. to 100° C. at a microwave power ranging from 50 watts to 2000 watts for not more than 10 minutes. More preferably, step 14 is conducted at a temperature ranging from 60° C. to 80° C. at a microwave power ranging from 150 watts to 300 watts for not more than 5 minutes.

It is further noted that the peripheries of the graphene nanoribbons thus formed are formed with oxidized functional groups because the graphene nanoribbons are obtained by unzipping of the carbon nanotubes using the oxidant. Therefore, a reduction process can be conducted using a reductant, such as hydrazine ($N_2H_4$), in order to reduce the oxidized functional groups of the graphene nanoribbons so as to obtain the graphene nanoribbons that are completely carbon-hydrogen bonded. The reductant and the reaction conditions for the reduction process are well known in the art and will not be described in detail herein.

By virtue of the microwave heating step, the carbon nanotubes may absorb microwave energy and the microwave energy itself may result in molecular dipole rotation and ionic conduction of the carbon nanotubes, thereby rapidly raising the temperature. Therefore, a desired unzipping reaction can be achieved for only one tenth of the time that is required in the conventional method using the heat convection manner. In addition, the graphene nanoribbons with improved quality can be obtained.

The above and other features and advantages of the present invention will become apparent in the following detailed description of Examples 1 to 3. It is understood that the Examples are solely intended for illustration, and should not be construed as limiting the practice of the present invention.

EXAMPLE 1

Figure 3:
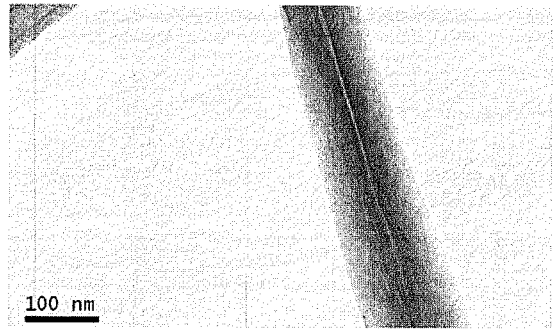
FIG. 3 is a transmission electron microscopy photograph illustrating a multi-walled carbon nanotube used in the examples of the present invention.

45 ml of sulfuric acid solution was mixed with 5 ml of phosphoric acid to obtain an acidic aqueous solution. 0.05 g of multi-walled carbon nanotubes as shown in FIG. 3 was added into the acidic aqueous solution followed by stirring at room temperature for about 1 hour to obtain a nanotube-dispersing solution. Thereafter, the nanotube-dispersing solution was heated by microwave at a microwave power of 200 watts for 2 minutes to conduct surface modification of the carbon nanotubes.

Next, 0.25 g of potassium permanganate was added into the nanotube-dispersing solution followed by stirring at room temperature for about 30 minutes to obtain a reaction solution. The reaction solution was heated by microwave at a microwave power of 150 watts for 4 minutes to maintain the reaction temperature at about 65° C. The reaction solution was filtered using a filter and an aspirator. The powders on the filter were scraped off and dried to obtain graphene nanoribbons.

EXAMPLES 2 and 3

The steps in Examples 2 and 3 were similar to those in Example 1 except that the reaction solution was heated by microwave at a microwave power of 200 watts and 250 watts, respectively.

Figure 4:
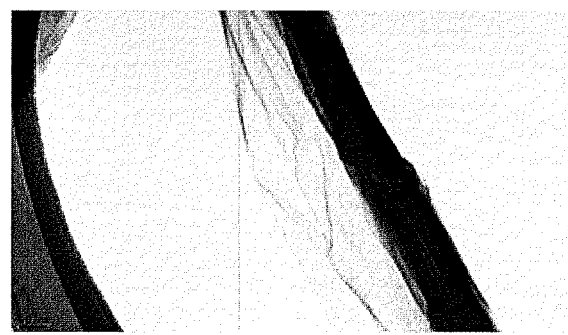
FIG. 4 is a transmission electron microscopy photograph illustrating a graphene nanoribbon obtained from Example 1.
Figure 5:
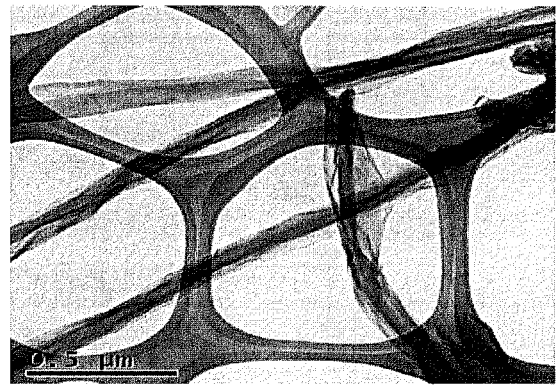
FIG. 5 is a transmission electron microscopy photograph illustrating a graphene nanoribbon obtained from Example 2.
Figure 6:
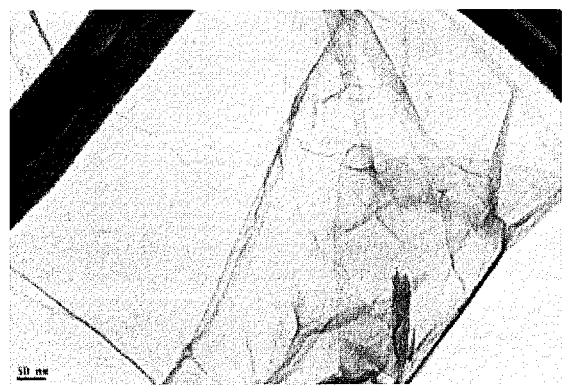
FIG. 6 is a transmission electron microscopy photograph illustrating a graphene nanoribbon obtained from Example 3.

FIGS. 4 to 6 are transmission electron microscopy photographs showing the graphene nanoribbons obtained from Examples 1 to 3.

From the transmission electron microscopy in FIGS. 4 to 6, it is revealed that, when the microwave heating step of the present invention is carried out at a microwave power ranging from 150 watts to 250 watts, the carbon nanotubes can be unzipped to obtain the graphene nanoribbons, and only 4 minutes are required to unzip the carbon nanotubes.

Figure 7:
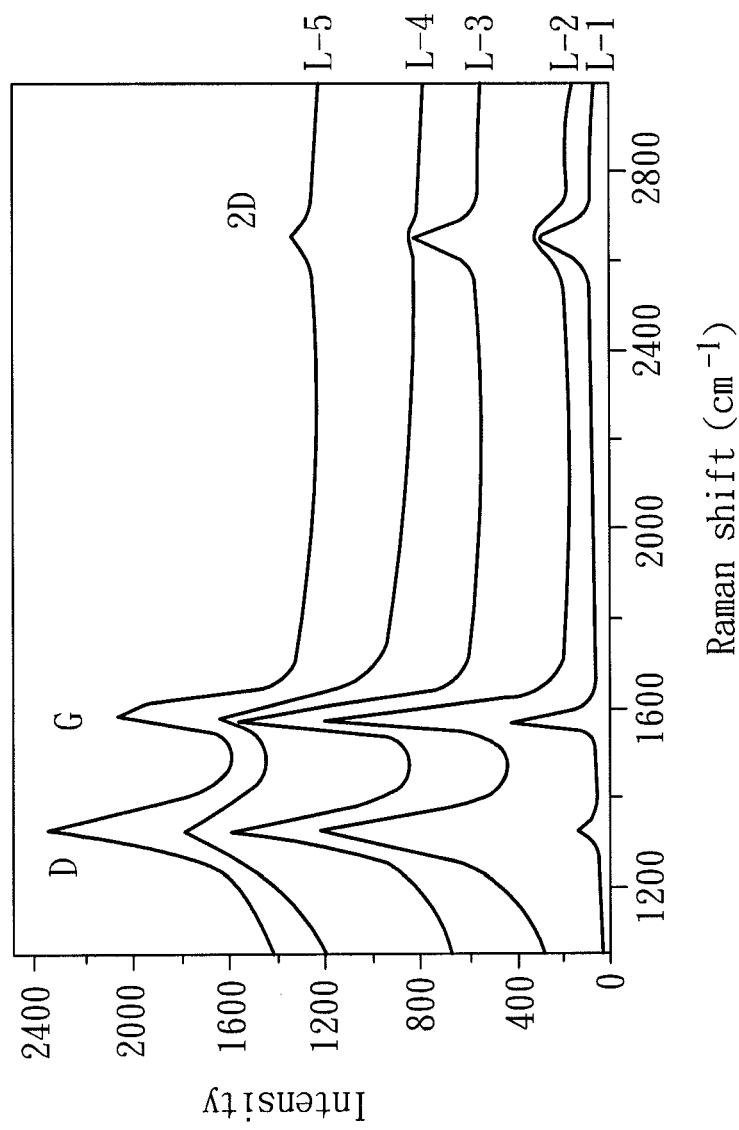
FIG. 7 is Raman spectra for the multi-walled carbon nanotube, the standard graphene nanoribbon, and the graphene nanoribbons obtained from Examples 1 to 3.

As shown in FIGS. 7, L-1 to L-5 represent respectively the Raman spectrum of multi-walled carbon nanotubes, the Raman spectrum of standard graphene nanoribbons, and the Raman spectra of the graphene nanoribbons obtained from Examples 1 to 3.

The peak D (D band) at 1360 cm$^{-1}$ represents the existing of amorphous carbon, i.e., carbon-carbon single bond, and the peak G (G band) at 1580 cm$^{-1}$ represents the existing of graphite, i.e., carbon-carbon double bond. Further, 2D (2D band) is a symmetrical peak of the D-band. It is evident from L-1 and L-2 in FIG. 7 that the characteristic peaks of the multi-walled carbon nanotubes are G-band and 2D-band. In addition, since graphene nanoribbons have a few of carbon-carbon single bonds, D-band is also found in the Raman spectrum. Therefore, after comparing the Raman spectra of L-3 to L-5 with the Raman spectra of L-1 and L-2, it is understood that the same characteristic absorption occurs in L-3 to L-5 and L-2, which indicates graphene nanoribbons can be successfully obtained using the method of the present invention, i.e., the carbon nanotubes can be successfully unzipped within a very short time using microwave heating.

To sum up, the microwave heating step of the method for forming graphene nanoribbons according to the present invention can unzip the carbon nanotubes by controlling the microwave power and the microwave time. As compared to the conventional heat convection manner, the microwave permits the carbon nanotubes to absorb directly the microwave energy, thereby resulting in rapid rise in temperature to effectively accomplish unzipping reaction. Therefore, the reaction time in the method of the present invention can be dramatically reduced, and the yield and quality of graphene nanoribbons can be improved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for forming graphene nanoribbons, comprising:
   (a) dispersing carbon nanotubes in a solvent to obtain a nanotube-dispersing solution;
   (b) adding an oxidant into the nanotube-dispersing solution to obtain a reaction solution; and
   (c) microwave heating the reaction solution and longitudinally unzipping the carbon nanotubes to form graphene nanoribbons;
   wherein the method further comprises, before step (b), a step of (d) microwave heating the nanotube-dispersing solution to surface-modify the carbon nanotubes.

2. The method of claim 1, wherein the solvent has a pH value of not greater than 4.

3. The method of claim 1, wherein a weight ratio of the oxidant to the carbon nanotubes is not less than 2/1.

4. The method of claim 3, wherein the weight ratio of the oxidant to the carbon nanotubes is not less than 5/1.

5. The method of claim 1, wherein the oxidant is selected from the group consisting of potassium chlorate, sodium chlorate, potassium perchlorate, hydrogen peroxide, potassium permanganate and combinations thereof.

6. The method of claim 1, wherein step (c) is conducted at a microwave power ranging from 50 watts to 2000 watts.

7. The method of claim 6, wherein step (c) is conducted at a microwave power ranging from 50 watts to 300 watts.

8. The method of claim 1, wherein step (c) is conducted for not more than 10 minutes.

9. The method of claim 1, wherein step (c) is conducted at a temperature ranging from 50° C. to 100° C.

10. The method of claim 9, wherein step (c) is conducted at a temperature ranging from 60° C. to 80° C.

11. The method of claim 1, wherein step (d) is conducted at a microwave power ranging from 150 watts to 300 watts for not more than 5 minutes.

12. The method of claim 1, wherein the solvent has a pH value ranging from 1 to 3.

13. A method for forming graphene nanoribbons, comprising:
   (a) dispersing carbon nanotubes in a solvent to obtain a nanotube-dispersing solution;
   (b) adding an oxidant into the nanotube-dispersing solution to obtain a reaction solution; and
   (c) microwave heating the reaction solution and longitudinally unzipping the carbon nanotubes to form graphene nanoribbons;
   wherein step (c) is conducted for not more than 10 minutes.

14. The method of claim 13, wherein the solvent has a pH value of not greater than 4.

15. The method of claim 13, wherein a weight ratio of the oxidant to the carbon nanotubes is not less than 2/1.

16. The method of claim 15, wherein the weight ratio of the oxidant to the carbon nanotubes is not less than 5/1.

17. The method of claim 13, wherein the oxidant is selected from the group consisting of potassium chlorate, sodium chlorate, potassium perchlorate, hydrogen peroxide, potassium permanganate and combinations thereof.

18. The method of claim 13, wherein step (c) is conducted at a microwave power ranging from 50 watts to 2000 watts.

19. The method of claim 13, wherein step (c) is conducted at a temperature ranging from 50° C. to 100° C.

* * * * *